US011469939B2

(12) United States Patent
Yan et al.

(10) Patent No.: US 11,469,939 B2
(45) Date of Patent: *Oct. 11, 2022

(54) METHOD AND APPARATUS FOR PROVIDING TROUBLE ISOLATION VIA A NETWORK

(71) Applicants: AT&T Intellectual Property I, L.P., Atlanta, GA (US); AT&T Mobility II LLC, Atlanta, GA (US)

(72) Inventors: He Yan, Berkeley Heights, NJ (US); Anthony Caracciolo, East Brunswick, NJ (US); Mira Desta, Lawrenceville, GA (US); Zihui Ge, Madison, NJ (US); Brian Heard, Mckinney, TX (US); Sarat Puthenpura, Berkeley Heights, NJ (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/063,697

(22) Filed: Oct. 5, 2020

(65) Prior Publication Data

US 2021/0021458 A1 Jan. 21, 2021

Related U.S. Application Data

(63) Continuation of application No. 16/780,399, filed on Feb. 3, 2020, now Pat. No. 10,797,937, which is a
(Continued)

(51) Int. Cl.
*H04W 24/00* (2009.01)
*H04L 41/0631* (2022.01)
(Continued)

(52) U.S. Cl.
CPC ...... *H04L 41/0631* (2013.01); *H04L 41/5074* (2013.01); *H04L 43/091* (2022.05); *H04W 24/04* (2013.01); *H04W 24/02* (2013.01)

(58) Field of Classification Search
CPC ..... H04W 24/00; H04W 24/06; H04W 24/08; H04W 28/04; H04L 43/00; H04L 43/08;
(Continued)

(56) References Cited

U.S. PATENT DOCUMENTS 7,886,189 B2 * 2/2011 Mori .................. H04W 24/08
714/25
7,954,010 B2 * 5/2011 Beattie, Jr. .......... H04L 41/0681
714/43
(Continued)

OTHER PUBLICATIONS

Nguyen, Binh, "Absence: Usage-based Failure Detection in Mobile Networks" dated Sep. 7, 2015, pp. 1-13.

*Primary Examiner* — Shantell L Heiber

(57) ABSTRACT

A method and apparatus for providing trouble isolation are disclosed. For example, the method monitors a plurality of sessions for a user group for detecting an abnormal cause code associated with the user group, determines a root cause for the abnormal cause code when a deviation is determined to have occurred for the cause code of the user group, wherein the root cause identifies either an issue associated with the communications network or an issue associated with user endpoint devices of the user group, and generates a ticket indicating the root cause.

20 Claims, 5 Drawing Sheets

Related U.S. Application Data continuation of application No. 15/227,451, filed on Aug. 3, 2016, now Pat. No. 10,554,478.

(51) Int. Cl.
*H04L 41/5074* (2022.01)
*H04W 24/04* (2009.01)
*H04L 43/091* (2022.01)
*H04W 24/02* (2009.01)

(58) Field of Classification Search
CPC ...... H04L 43/50; H04L 41/0631; G06F 11/22; G06F 11/00; G06F 11/30; H04B 17/00; H04B 3/46
See application file for complete search history.

(56) References Cited

U.S. PATENT DOCUMENTS

| | | | |
|---|---|---|---|
| 8,005,010 B2 | 8/2011 | Breslau et al. | |
| 8,423,012 B1 | 4/2013 | Abou-El-Ella et al. | |
| 8,644,813 B1 | 2/2014 | Gailloux et al. | |
| 8,666,390 B2 | 3/2014 | Meredith et al. | |
| 8,958,771 B2 | 2/2015 | Flynn et al. | |
| 9,001,685 B1 | 4/2015 | Lushear et al. | |
| 9,071,551 B2 | 6/2015 | Caicedo et al. | |
| 9,210,600 B1 | 12/2015 | Jadunandan et al. | |
| 9,215,159 B2 | 12/2015 | Raleigh et al. | |
| 9,265,025 B2 | 2/2016 | Christensson et al. | |
| 9,301,185 B1 | 3/2016 | Koller et al. | |
| 10,541,889 B1* | 1/2020 | Mishra | H04L 43/04 |
| 2007/0116185 A1* | 5/2007 | Savoor | H04M 3/5191 |
| | | | 379/9 |
| 2008/0026768 A1* | 1/2008 | Fok | H04N 21/4126 |
| | | | 455/452.2 |
| 2008/0151773 A1* | 6/2008 | Kawaba | H04L 41/5009 |
| | | | 370/252 |
| 2008/0316931 A1 | 12/2008 | Qiu et al. | |
| 2009/0144413 A1 | 6/2009 | Khan et al. | |
| 2014/0024348 A1 | 1/2014 | Hurst et al. | |
| 2016/0029145 A1 | 1/2016 | Angiolillo et al. | |
| 2016/0029228 A1* | 1/2016 | Mufti | H04W 24/04 |
| | | | 370/225 |
| 2016/0135102 A1 | 5/2016 | Gunnarsson et al. | |
| 2016/0183241 A1 | 6/2016 | Lee et al. | |
| 2016/0277952 A1* | 9/2016 | Hui | H04W 24/08 |
| 2017/0078483 A1 | 3/2017 | Seward et al. | |
| 2018/0006925 A1* | 1/2018 | Bohra | H04L 43/50 |

* cited by examiner

METHOD AND APPARATUS FOR PROVIDING TROUBLE ISOLATION VIA A NETWORK

This application is a continuation of U.S. patent application Ser. No. 16/780,399, filed on Feb. 3, 2020, now U.S. Pat. No. 10,797,937, which is a continuation of U.S. patent application Ser. No. 15/227,451, filed Aug. 3, 2016, now U.S. Pat. No. 10,554,478, which are herein incorporated by reference in their entireties.

The present disclosure relates to a method and apparatus for providing trouble isolation in a cellular communication network, e.g., UMTS or LTE cellular network.

BACKGROUND

As a cellular network service provider expands its network and/or services that are provided on the network, the provider needs to support a large number of customers. In turn, the service provider may receive a large number of calls related to various troubles that the customers may experience with any number of services provided by the service provider. For example, a customer may contact the service provider to report various troubles relating to a data service, a voice service, a video streaming service, etc.

SUMMARY OF THE DISCLOSURE

In one embodiment, the present disclosure teaches a method and apparatus for providing trouble isolation in a cellular communications network. For example, the method monitors a plurality of sessions for a user group for detecting an abnormal cause code associated with the user group, determines a root cause for the abnormal cause code when a deviation is determined to have occurred for the cause code of the user group, wherein the root cause identifies either an issue associated with the communications network or an issue associated with user endpoint devices of the user group, and generates a ticket indicating the root cause.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
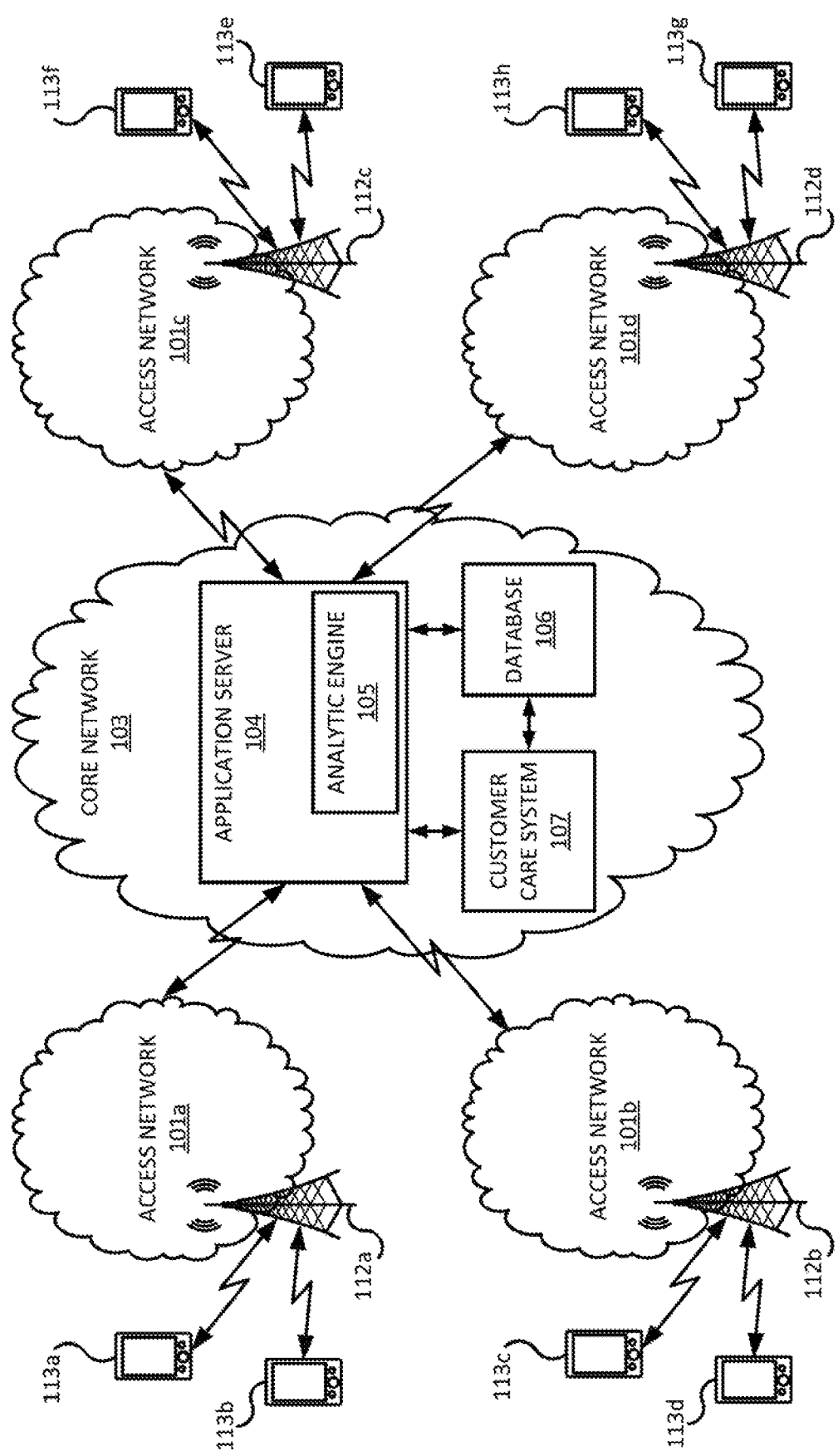
FIG. 1 illustrates an example network related to the present disclosure.

The present disclosure relates to a method and apparatus for providing trouble isolation via a communications network, e.g., a communications network of a network service provider. The teachings of the present disclosure may be applied via any type of wired or wireless communications network.

As described above, the network service provider may receive a large number of calls related to various troubles related to a service that is provided by the network service provider. For example, suppose a customer has trouble with accessing a service, e.g., a data service, a voice service, and the like, via a wireless communications network. The customer may contact his/her wireless communications network service provider and report the trouble. If the trouble cannot be identified and resolved quickly, the wireless communications network service provider may then suggest that the customer bring the mobile device being used to access the service to a location, e.g., a customer service center, or a store, for further troubleshooting to be performed. An attempt may then be made to identify a root cause and remedy the situation. For instance, a representative of the network service provider may inquire as to the circumstances leading up to the customer experiencing the trouble, e.g., by asking a series of questions to the customer. The questions may involve identifying a type of trouble and/or determining whether the trouble was preceded by an activity, e.g., an installation of a new software application on the mobile device. If the customer has indeed performed an activity prior to experiencing the trouble, the representative of the network service provider may correlate the trouble to the prior activity and suggest undoing the prior activity. For example, the suggestion may be to uninstall the software application. However, the source of the trouble, i.e., the root cause, may not be the software application and the removal of the software application from the mobile device may not provide a remedy to the trouble. Moreover, the customer may not wish to uninstall the software application from his/her mobile device and may become dissatisfied with the service. Since troubleshooting may involve some level of speculation as to the underlying cause, the customer may quickly become disenchanted with the network service provider if a solution cannot be deduced quickly even when the trouble may not have originated from the network service provider's network or services.

The present disclosure provides an efficient method for trouble isolation. The trouble isolation is performed for separating troubles by a root cause. The root cause refers to a condition that may be prevented or remedied in order to ensure that an undesirable event does not occur. The root cause may be an issue associated with a user endpoint device or an issue associated with the communications network itself. For an illustrative example, suppose a customer reports that his/her voice calls are being dropped. The network service provider may determine that the issue with voice calls being dropped is associated with a recent upgrade to a new operating system on the user endpoint device. The proposed solution to address this particular condition of dropped calls may then be to simply roll back to a previous version of the operating system for this particular type of user endpoint device. In this example, it is clear that the trouble originated from the user endpoint device and the network service provider's network or services did not cause or contribute to the underlying root cause of the trouble.

In order to provide the trouble isolation, the method of the present disclosure first obtains a list of network elements through which a user endpoint device may access services. For example, the network service provider may obtain a list of network elements (e.g., Wi-Fi access points, base stations for 2G, 3G, Long Term Evolution (LTE), 5G networks, etc.) that may be used by a user endpoint device to attach to a network and to access one or more services. In one embodiment, the list of network elements may be obtained from a server of the network service provider. For example, the list of base stations may be previously stored on the server.

The method establishes at least one category with which user endpoint devices are to be associated. In one embodiment, the categories that are to be established are based on a predetermined granularity level. For example, the predetermined granularity level may be for establishing these categories based on at least one of: a type of a user endpoint device, a manufacturer of a user endpoint device, an operating system of a user endpoint device, a version of an operating system of a user endpoint device, and a software application installed in a user endpoint device. For instance, a first category may be for all smart phones, a second category may be for smart phones manufactured by a particular manufacturer, a third category may be for smart phones using an Android operating system, a fourth category may be for smart phones using an iPhone Operating System (iOS), a fifth category may be for smart phones using a microkernel-based operating system (e.g., a BlackBerry phone), a sixth category may be for smart phones running a particular version of an operating system (e.g., a particular version of an iOS, Android, or microkernel-based operating system), a seventh category may be for smart phones that have installed a particular browser software application, an eighth category may be for smart phones that have installed a particular social networking application (e.g., Facebook, Snapchat, Twitter, etc.), a ninth category may be for smart phones that have installed a particular antivirus software application, and so on.

The method then associates each user endpoint device with at least one of the categories. For example, a smart phone with an iOS operating system may be associated with the first and the fourth categories. Suppose the sixth category is for smart phones running on iOS 9 software and the smart phone is running on iOS 9, then the smart phone may further be associated with the sixth category.

The method then establishes at least one user group. In one embodiment, a user group is established for a set of user endpoint devices that are associated with a particular category (i.e., a same category) and are associated with the same network element. For example, suppose the category is for iPhone 6 user endpoint devices. Suppose also there are 100 network elements in a geographical area. Then, there may be a maximum of 100 user groups that can be established (e.g., one user group for each of the 100 network elements), with each user group being for a set of iPhone 6 user endpoint devices associated with the same network element.

In order to clearly describe the user groups of the present disclosure, the categories and network elements, described above, may be visualized as a 2-dimensional matrix. The 2-dimensional matrix comprises a first dimension for categories with which user endpoint devices may be associated and a second dimension for the network elements. Suppose the first and second dimensions are represented by rows and columns of the matrix, respectively. Then, element ij of the matrix (i.e., row i and column j) is for a user group that includes user endpoint devices associated category i that are associated with network element j. When the matrix is an m by n matrix, m×n user groups may be established.

For cases in which sufficient data is available for a user group, the method may perform the trouble isolation for the user group as described below. For example, the method may continuously monitor sessions associated with the user group for detecting abnormal cause codes. When the trouble isolation is performed in response to receiving a request from a customer care system (described below), the method may collect data on abnormal cause codes from a database.

However, in some cases, a user group may comprise a limited number of user endpoint devices and may not yield sufficient data for accurate analysis. For example, a less popular mobile device may have an insufficient number of user endpoint devices in a given user group. Thus, for cases in which sufficient data is not available, the method of the present disclosure establishes an initial generic baseline model that applies to all user groups. In one example, the initial generic baseline model is regression based.

The method then uses a rule mining approach to identify sub-groups of users from among all of the users which have a behavior which deviates from the initial baseline in a consistent manner. For example, a sub-group may be for all users in a region that behave the same way, for all users with a certain OS that behaves the same way, and so on. The method then provides a baseline model for each sub-group. Then, the method may identify anomalies (i.e., abnormalities) for a sub-group using a respective baseline model of the sub-group. The trouble isolation may then be performed for the anomalies that are identified.

When no user endpoint device associated with category i is on the network element j, the element ij may be ignored. In other words, when no user endpoint device is associated with the element ij, the element ij comprises a null set and no further analysis is to be performed for element ij.

Returning to the case in which sufficient data is available for the user group, the method may monitor sessions, for a user group. For example, the monitoring may be for detecting when there is an abnormal cause code of the user group. In one embodiment, the abnormal cause code of the user group comprises a Session Initiation Protocol (SIP) error code for the session that is monitored. For example, the SIP error code may be for indicating an abnormality related to at least one of: a bad extension (e.g., the Session Initiation Protocol (SIP) extension that is used is not understood), a bad request (e.g., the request could not be understood), a call that does not exist, a transaction that does not exist, an extension that is required (e.g., a SIP extension is required), a forbidden request (e.g., a fulfillment of a request is refused, however the request is understood), an interval being too brief (e.g., an expiration time of a requested resource is too short), a requested user not being found (e.g., the user is not located at a domain specified in the request), a requested item not being implemented (e.g., a server cannot fulfil the request), a request being terminated, a request timing out, a security agreement being required, a server internal error being detected, a service being unavailable, a service being temporarily unavailable, a request being unauthorized, a requester being for an unknown resource, a request having an unsupported URI scheme, a version not being supported, a request needing to use a particular proxy, and trying (e.g., indicating trying for an excessive amount of time).

The monitoring of the session may be for any service provided to the user endpoint device. For example, the session may be for a voice service, a data service, a streaming service, a gaming service, etc. When the monitoring is for a session that is already established, the session is between a user endpoint device of the user group and the network element on which the user endpoint device is located or served. For example, suppose the user group is for iPhone users on a particular base station. Then, the method monitors each session that is established between each iPhone of the user group and the particular base station. Similarly, the method monitors each session to be established between a user endpoint device of the user group and the network element on which the user endpoint device is to be located when the request is granted. The term "located" is intended to cover the scenario where a user endpoint device is being serviced by a particular network element. Thus, a user endpoint device may be served by one or more network elements simultaneously.

The method then determines whether an abnormal cause code of the user group is detected. For example, an abnormal cause code may be detected for the session associated with a user endpoint device of the user group.

When an abnormal cause code of the user group is detected, the method updates data associated with the abnormal cause code of the user group. For example, suppose a session request times out for a user endpoint device of the user group. The method may increment a counter of the abnormal cause code by one for indicating the detection of the timing out of the session request for the user endpoint device of the user group.

The method then determines, for the user group, whether a deviation is determined for at least one abnormal cause code of the user group. In one embodiment, the deviation is determined from a baseline that is established for the abnormal cause code of the user group. In one embodiment, the baseline for the abnormal cause code of the user group is established using a prediction model. For example, for a user group, historical data for each abnormal cause code of the user group may be analyzed to establish a baseline for each respective abnormal cause code of the user group. For example, suppose for a user group, the prediction model based on historical data for the abnormal cause code of "bad request" indicates that a probability of a session request being a bad request is 0.001 for a given time interval. Then, the method may predict, for the user group, a number of bad requests based on the number of session requests. For example, suppose the number of session requests in a time interval is five thousand. Then, for the time interval in which the five thousand session requests are received for the user group, five of the five thousand session requests may be expected to be bad requests for the given time interval. In this illustrative example, detecting more than five bad requests may cause a deviation to be detected for the abnormal cause code of "bad request." It should be noted that in one example a small tolerance can also be set to the baseline so that the determination of a deviation would not be immediately deemed to have occurred if a count of any cause code exceeds its respective baseline, to avoid the scenario where the trouble isolation system being overly sensitive.

In one embodiment, the baseline for the abnormal cause code of the user group is established in accordance with a performance criterion. For example, the network service provider may provide the performance criterion for each type of abnormal cause code that may be tracked. In one embodiment, the network service provider may provide the performance criterion on a per user group basis. For example, the performance criterion may be for a user group that is established for a type of user endpoint device. In another example, the network service provider may provide the performance criterion based on a submarket. In yet another example, the network service provider may provide the performance criterion based on a version of an operating system deployed in a user endpoint device.

In one embodiment, the abnormal cause codes of the user group are aggregated over a predetermined time interval. For example, the method may aggregate the abnormal cause codes of the user group over an hour, a day, a month, and so on. In one embodiment, the performance criterion may be based on the predetermined time interval. For example, a performance criterion provided for an hour may be different from a performance criterion provided for a month. Other embodiments for aggregating the abnormal cause codes are described below.

When the deviation is determined for the abnormal cause code of the user group, the method performs trouble isolation for separating troubles by a root cause. In one embodiment, the trouble isolation may be for determining whether the root cause is an issue associated with a communications network operated by a network service provider, or an issue associated with user endpoint devices of the user group, e.g., a mobile device. In other words, the trouble isolation is for determining whether the trouble is caused by the mobile devices of the user group being used to access the service provided by the communications network, or by network elements themselves, e.g., base stations, switches, routers, firewalls, and the like, of the communications network. For example, the method may identify a list of user groups that are affected by the trouble that is being isolated. That is, the method may identify the list of user groups that are affected by the same issue. The method may then perform an analysis to determine similarities and differences among the user groups that are on the list to identify a root cause.

In one embodiment, when the root cause is an issue associated with the user endpoint devices of the user group, the trouble isolation may further be for determining whether the root cause is associated with at least one of: a type of the user endpoint devices of the user group, an operating system of the user endpoint devices of the user group, a model of the user endpoint devices of the user group, a configuration of the user endpoint devices of the user group, a software application that is installed on the user endpoint devices of the user group, and a configuration of a software application that is installed on the user endpoint devices of the user group. For instance, suppose the trouble occurred due to user endpoint devices using a browser that is incompatible with a service provided by the network service provider. Then, the browser that is incompatible with the service provided by the network service provider is identified.

In one example, the method then generates a ticket. In one embodiment, the ticket is for indicating that the root cause is an issue associated with a communications network operated by a network service provider. In one example, the issue may then be addressed via a software or hardware update for a network element of the communications network. In one embodiment, the ticket is for indicating that the root cause is an issue associated with the user endpoint devices of the user group. For example, the ticket may indicate that the root cause is associated with: a type of the user endpoint devices, an OS of the user endpoint devices, and so on.

In one embodiment, the ticket may provide information to a manufacturer. For example, the manufacturer of the user endpoint devices of the user group may be notified of the trouble so that an update, e.g., software or a hardware update, can be provided for resolving the issue. This trouble isolation approach increases the satisfaction of the customer with the network service provider and also the manufacturer of the user endpoint device.

In one embodiment, the ticket may be for providing a notice to a customer care system. The notice identifies user endpoint devices and services that are affected by the root cause. For example, when the root cause is an issue associated with the user endpoint devices of the user group, the method may provide a notice to a customer care system indicating which user endpoint devices (e.g., types of user endpoint devices, models, operating systems, etc.) and services (e.g., data, voice, streaming, gaming, etc.) are affected by the root cause. To illustrate, suppose a new release of an operating system (e.g., a new or an upgraded version) for a particular type of user endpoint devices is causing an issue for accessing a service to which the user endpoint devices subscribe. The method may provide a notice to the customer care system. In fact, the notice may be provided to the customer care system even before the customer care system begins to receive a report of a performance problem associated with the newly released operating system from any customer. In other words, the notice may be provided to the customer care system proactively.

In one embodiment, a customer may contact the network service provider reporting a performance problem. In turn, the network service provider may determine that the report is regarding a known performance problem and address the performance problem accordingly. For an illustrative example, suppose an upgrade to an operating system deployed in a user endpoint device is determined as causing a deviation. The service provider may identify a solution in advance of receiving a report of a performance problem from a customer. When the customer contacts the network service provider about the known performance problem, the customer may then be notified of the issue associated with the upgraded operating system and/or provided with a solution.

In one embodiment, the customer care system may send a notification to a user endpoint device that subscribes to a service that is affected by the root cause. For the example above, the notification may be sent to user endpoint devices that subscribe to the service that is incompatible with the new release of the operating system. In one embodiment, the notification may be sent to user endpoint devices proactively. For example, the notification may be sent prior to the incompatible version of the operating system being downloaded on the user endpoint device. In other words, the notification may serve as an advance warning to enable the user to refuse or opt-out of an upgrade to the incompatible version of the operating system.

To illustrate by way of an example, suppose a thousand (1,000) user endpoint devices use OS release 5 and also subscribe to a streaming service. Suppose, at a later time, some of the 1,000 user endpoint devices are upgraded to OS release 6. When the OS release 6 is incompatible with the streaming service, suppose the user endpoint device receives a response indicating that the service is temporarily unavailable. The abnormal cause code may then be for a service being temporarily unavailable. When a deviation is determined for a number of session requests with a corresponding response of "service is temporarily unavailable," the method performs trouble isolation for separating troubles by a root cause. For the example, the root cause is a single release of the OS (i.e., release 6). The troubleshooting of the present disclosure may then identify that an upgrade to OS release 6 is the root cause for the deviation. Then, a notification (e.g., a warning about the incompatibility) may be sent to the 1,000 user endpoint devices. User endpoint devices that did not upgrade to OS release 6 may then be able to refrain from upgrading to release 6 until a remedy (e.g., a software patch) is provided. In addition, user endpoint devices that already upgraded to OS release 6 may be provided with a remedy for reverting back to OS release 5.

In one embodiment, the customer care system may notify user endpoint devices that they themselves constitute sources of a root cause via the notice. For instance, suppose the trouble is due to a few user endpoint devices utilizing an excessive amount of bandwidth. Then, the few user endpoint devices utilizing the excessive amount of bandwidth may be identified as the sources of the root cause. The customer care system may then send the notification to the few user endpoint devices that are identified as the sources of the root cause.

In one embodiment, when the customer care system notifies user endpoint devices that are sources of the root cause, the notification may include information as to the amount of bandwidth that the user endpoint device is entitled to use (i.e., allowed to use without incurring additional cost). In one embodiment, the notification that is sent by the customer care system to the user endpoint device further comprises information for modifying a service to which the user endpoint device subscribes. The information for modifying the service may comprise at least one of: service upgrade information and additional cost information that would be applicable when the issue is not resolved. For example, information for upgrading to a higher bandwidth service may be provided when a user endpoint device continues to use an excessive amount of bandwidth. In another example, information as to additional cost may be provided, where the additional cost is incurred when the bandwidth usage continues to be excessive.

In one embodiment, the trouble isolation of the present disclosure may be performed upon receiving a query for trouble isolation from a customer care system. For example, the customer care system may receive a report of a performance problem from a customer for a service to which the customer subscribes. The customer care system processes the report to determine whether the report is for a known performance problem. In one example, the customer care system may have received a notice from an application server before receiving the report from the customer. In another example, the report of the performance problem received from the customer may be the earliest indication of a potential problem with the service. In other words, the report received from the customer may be for a known performance problem or for a new performance problem that has yet to be detected (e.g., the number of occurrences may not have reached a level to be detected yet). When the report received from the customer is for a new performance problem, the customer care system sends a query for trouble isolation to an application server. In turn, the application server performs the trouble isolation to identify a root cause, generate a ticket, and provide a response to the query. When the report received from the customer is for a known performance problem, the customer care system may timely address the performance problem in accordance with a resolution for the known performance problem.

When the report is determined as being for a new performance problem (i.e., unknown), the query received by the application server from the customer care system may trigger the trouble isolation. The query may be processed to identify at least one user group with which the user endpoint device is associated. For each user group with which the user endpoint device is associated, the method collects data associated with abnormal cause codes of the user group. Then, the method determines whether a deviation is detected for at least one abnormal cause code of the user group. The method then performs the trouble isolation to separate troubles by a root cause when the deviation is detected for the abnormal cause code of the user group, and generates a ticket. In other words, the method determines whether the root cause is an issue associated with the network or the user endpoint devices of the user group. The method generates a ticket for indicating that the root cause is an issue associated with the network when the root cause is determined as being an issue associated with the network. Otherwise, the method generates a ticket for indicating that the root cause is an issue associated with the user endpoint devices of the user group.

In one embodiment, the method may then implement a solution to address the issue that is indicated in the ticket. For example, the method may perform a software update, modify a configuration on the user endpoint devices, modify a configuration on a network element of the network of the network service provider, uninstall a software application on the user endpoint devices, and so on.

Returning to the aggregating of the abnormal cause codes, in one embodiment, the method of the present disclosure aggregates the abnormal cause codes over a plurality of user groups. For example, the aggregating of the abnormal cause codes may be performed for combining abnormal cause codes that are associated with a plurality of user groups, with each user group being for: a type of user endpoint device, a version of an operating system of a user endpoint device, or a manufacturer of a user endpoint device.

In another example, suppose a geographical area, e.g., a geographical area covering a part of the country, is divided into a plurality of submarkets. A submarket refers to an identifiable geographical area that contains a group of users of goods and/or services offered to a public. The network service provider may determine a boundary for each submarket. For instance, for the United States of America, Los Angeles, Calif., and suburbs near Los Angeles to which the same goods and/or services would be offered may comprise one submarket. Each submarket may include any number of network elements that are represented by a respective column of the 2-dimensional matrix described above. Then, the aggregating may be performed for combining abnormal cause codes that are detected and are associated with the network elements in a given submarket. In other words, data for a given submarket may be obtained by combining a plurality of columns of the matrix, with each column being for a network element in the given submarket.

In one embodiment, the aggregating of the abnormal cause codes may be performed in accordance with a criterion that is provided by the network service provider. In one embodiment, the criterion that is provided by the network service provider is for aggregating the abnormal cause codes over at least one of: a submarket, a manufacturer of the network element of the user group, a type of user endpoint devices of the user group, a manufacturer of the user endpoint devices of the user group, a version of an operating system of the user endpoint devices of the user group, and a browser software of the user endpoint devices of the user group.

As described above, the abnormal cause codes that are detected may be aggregated over the plurality of user groups. A baseline for an abnormal cause code may then be established for the plurality of user groups—rather than for each user group. For example, suppose the plurality of user groups comprises: user groups A and B. A single baseline may be established for the abnormal cause code that are detected for: user group A, user group B, or user groups A and B. Similarly, for the abnormal cause code, the deviation may be from the baseline that is established for the plurality of user groups.

When the deviation is from the baseline that is established for the plurality of user groups, the trouble isolation may further comprise identifying whether a user group of the plurality of user groups is affected by the trouble. For the example above, the trouble may affect user group A, user group B, or both user groups A and B. The ticket may then be generated to address the issue in accordance with the trouble isolation.

FIG. 1 illustrates an example network 100 related to the present disclosure. In one illustrative embodiment, the network 100 may comprise access networks 101a, 101b, 101c and 101d, and a core network 103.

The access networks 101a-101d may comprise a Wi-Fi network, a cellular network (e.g., 2G, 3G, and the like), a long term evolution (LTE) network, and the like. The core network 103 may comprise any type of communications network, such as for example, a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, or a wireless network. It should be noted that an IP network is broadly defined as a network that uses Internet Protocol to exchange data packets.

Figure 4:
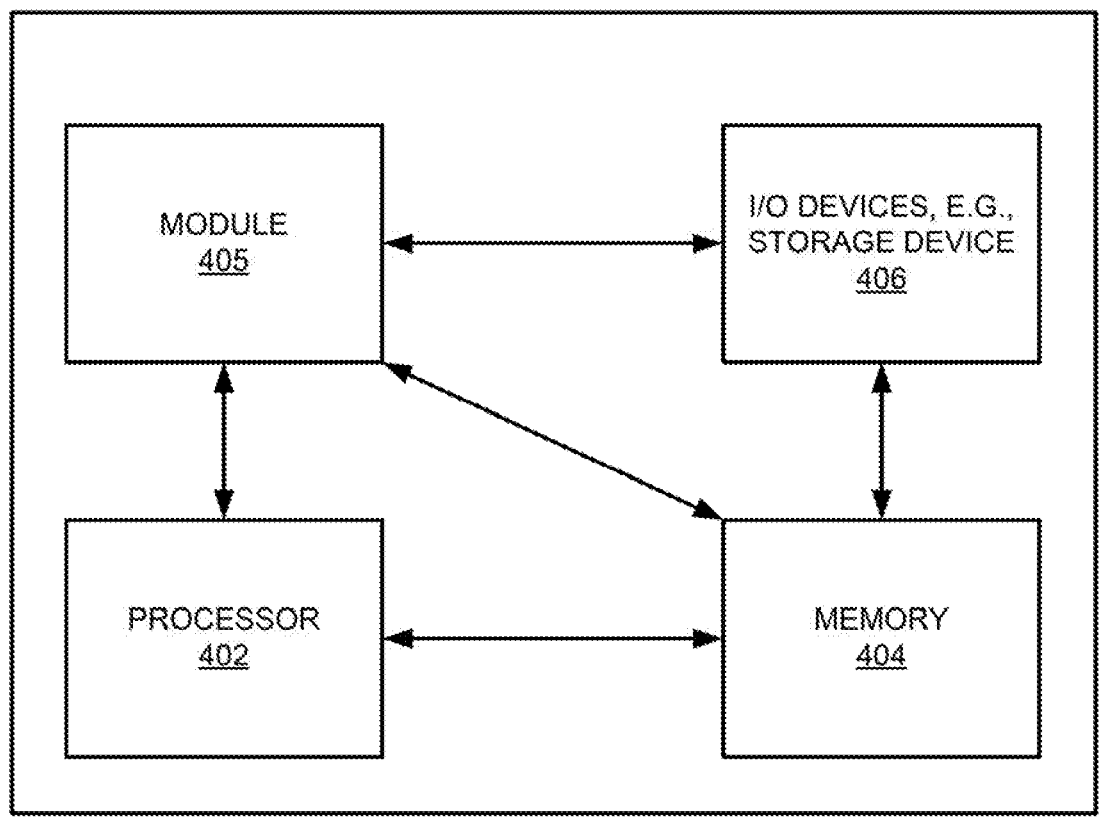
FIG. 4 depicts a high-level block diagram of a computer suitable for use in performing the functions described herein.

In one embodiment, a network element 112a is located in access network 101a, a network element 112b is located in access network 101b, a network element 112c is located in access network 101c, and a network element 112d is located in access network 101d. The network elements 112a-112d may comprise network elements of a cellular network (e.g., base stations, eNodeBs and the like), routers, gateway servers, and the like. In one embodiment, the core network 103 may include an Application Server (AS) 104, a database or database server 106, and a customer care system 107. In one embodiment, the AS 104 is a dedicated network hardware element configured to perform the methods and functions described herein (e.g., the method 200 discussed below). For example, the AS 104 may be deployed as a hardware device embodied as a dedicated server (e.g., the dedicated computer 400 as illustrated in FIG. 4). In other words, the AS 104 is for providing trouble isolation in accordance with the teachings of the present disclosure. The application server 104 may comprise an analytic engine 105. The application server 104 may be communicatively coupled with the database server 106 and the customer care system 107. The database server 106 may be communicatively coupled with the customer care system 107.

In one embodiment, the database server 106 is used for storing data gathered from various network elements that gather data about sessions. In addition, the database server 106 may be used for storing reports of performance problems, and data to be used for establishing user groups, for aggregating abnormal cause codes for user groups, for performing the trouble isolation, and for providing notices to a customer care system. The application server 104 may then access the data stored in the database server 106 when performing an analysis for providing the trouble isolation.

In one embodiment, one or more user endpoint devices 113a-113h may communicate with the application server 104 via an access network 101a, 101b, 101c, or 101d. For example, when the user endpoint device 113a is in the vicinity of access network 101a, the user endpoint device 113a may communicate with the application server 104 via the network element 112a located in the access network 101a.

It should be noted that the network 100 may include additional networks and/or network elements that are not shown to simplify the description of the present disclosure. For example, the access networks and the core network of FIG. 1 may include additional network elements (not shown), such as for example, base stations, border elements, gateways (e.g., Serving GW and PDN GW), firewalls, routers, switches, call control elements, Mobility Management Entities, various application servers (e.g., Home Subscriber Server, feature servers, etc.), and the like.

Although a single database or database server is shown in core network 103 of FIG. 1, various types of data may be stored in any number of databases or database servers. For instance, various databases, e.g., a database for user endpoint devices, submarkets, operating system versions of user endpoint devices, abnormal cause codes of user groups, notices to be sent to a customer care system, tickets that are generated, etc., may be deployed. In addition, various types of data may also be stored in a cloud storage. In other words, the network service provider may implement the service for providing trouble isolation of the present disclosure by storing data in a cloud storage and/or a centralized server.

In one embodiment, the AS 104 is used for implementing the present method for providing trouble isolation. The AS 104 of the present disclosure is for monitoring sessions for a user group, for performing trouble isolation for separating troubles by a root cause when a deviation is determined for at least one abnormal cause code of the user group, wherein the trouble isolation is for determining whether the root cause is an issue associated with the communications network or an issue associated with user endpoint devices of the user group, for generating a ticket indicating that the root cause is either an issue associated with the communications network, or an issue associated with the user endpoint devices of the user group. In one embodiment, the AS 104 is also for receiving a query for trouble isolation from a customer care system 107 and for performing the trouble isolation in response to the query.

Figure 2A:
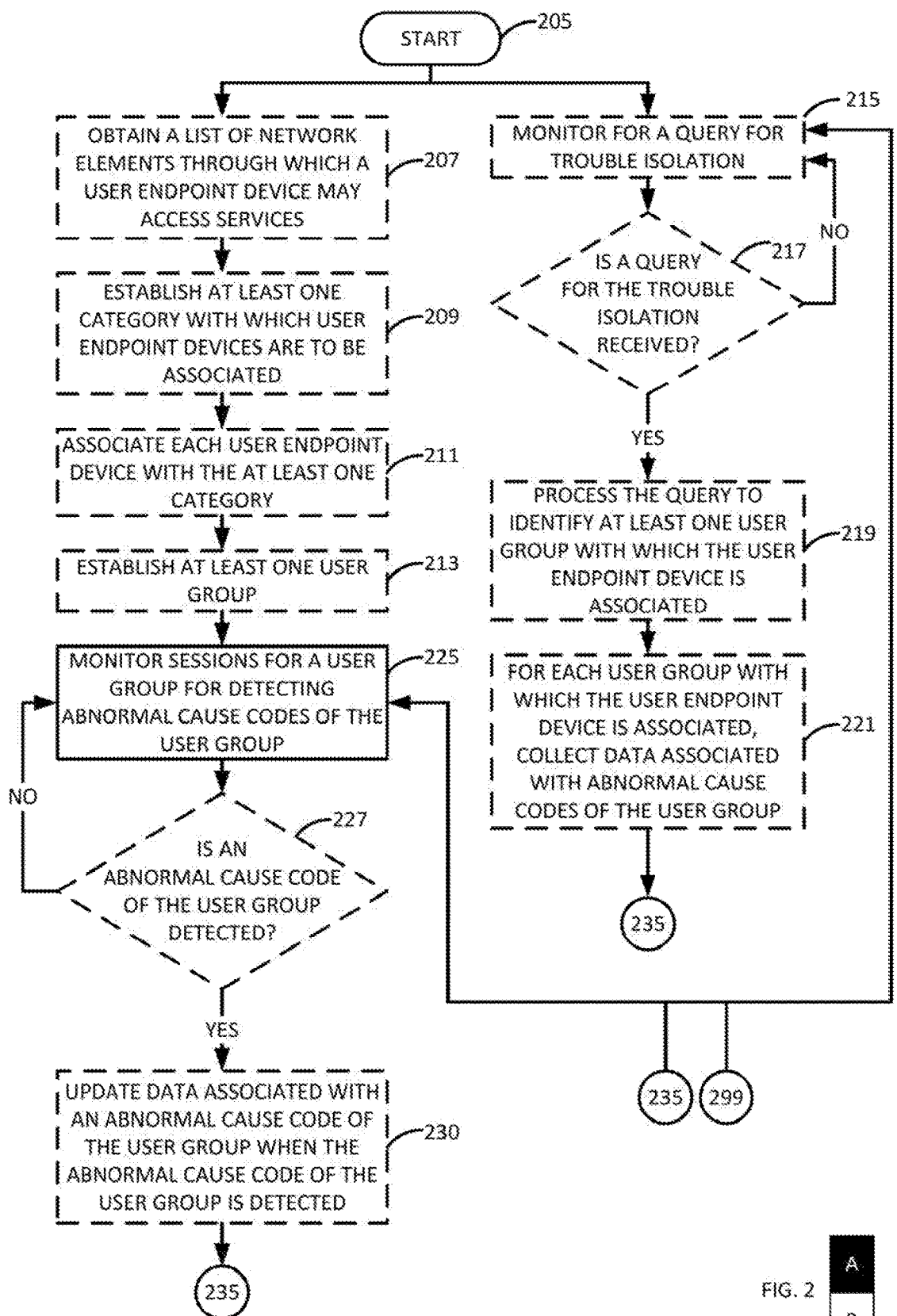
FIG. 2 (shown as FIG. 2A and FIG. 2B) illustrates a flowchart of an example method for providing trouble isolation by a server.
Figure 2B:
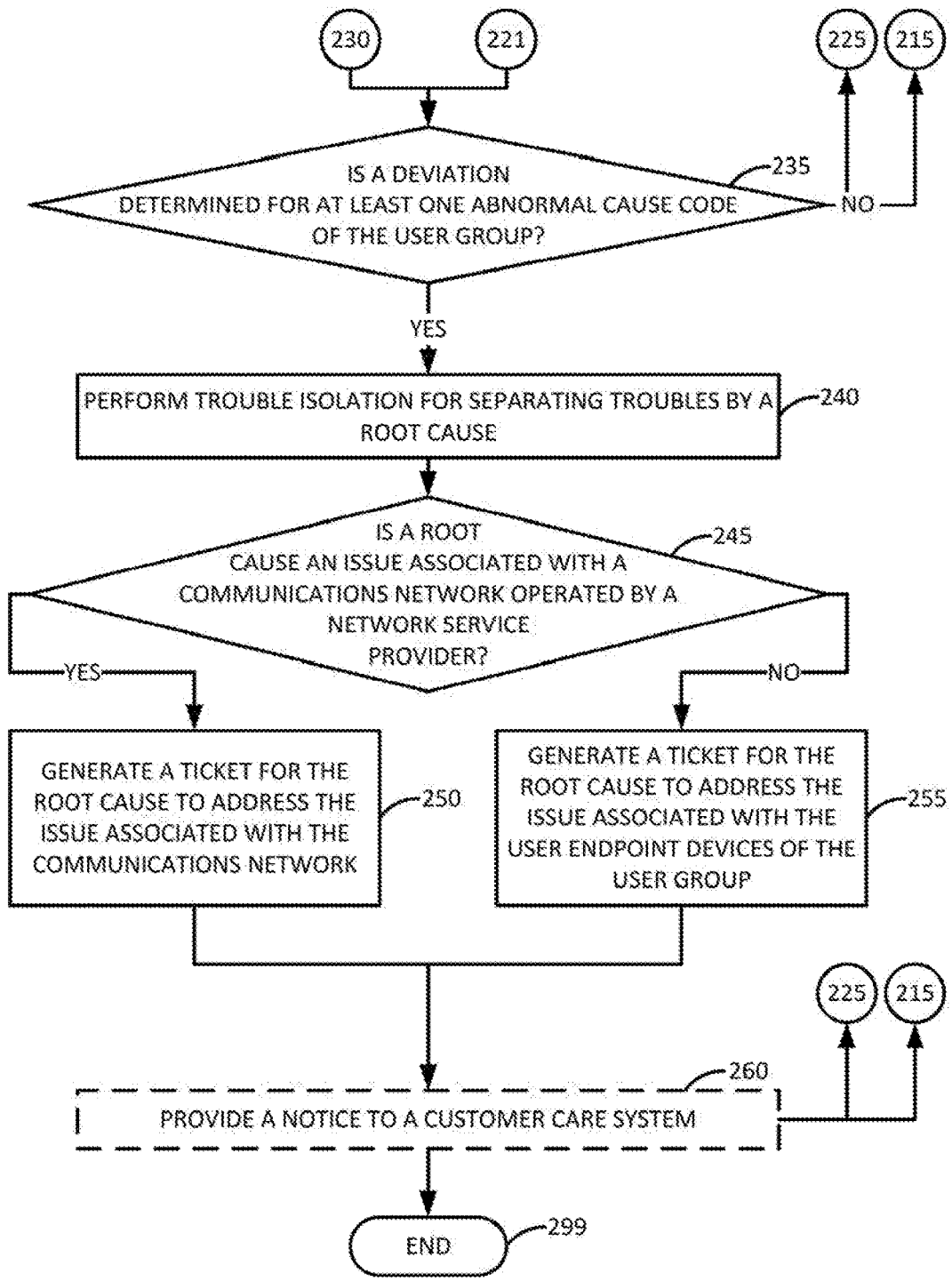

FIG. 2 illustrates a flowchart of an example method 200 for providing trouble isolation in accordance with the present disclosure. In one embodiment, the method 200 may be implemented in an application server, e.g., an application server 104, or the processor 402 as described in FIG. 4.

The method 200 may be implemented for any number of user groups. For example, the AS 104 may be used for a plurality of user groups, with any number of user endpoint devices being associated with each user group. For clarity, the flowchart of the example method 200 is described herein for a single user group. However, the method may be performed for any number of user groups in parallel. Moreover, the data associated with a plurality of user groups may be aggregated to performing the trouble isolation. For example, data for users groups in a submarket may be combined to provide trouble isolation for the submarket. The method 200 starts in step 205 and may proceed to step 207 and/or 215.

In optional step 207, the processor obtains a list of network elements through which a user endpoint device may access services. For example, the network service provider may obtain a list of network elements (e.g., Wi-Fi access points, base stations for 2G, 3G and Long Term Evolution (LTE) networks, etc.) that may be used by a user endpoint device to attach to a network and to access services.

In optional step 209, the processor establishes at least one category with which user endpoint devices are to be associated. For example, a category may be established for user endpoint devices based on a manufacturer, a model, an operating system, etc.

In optional step 211, the processor associates each user endpoint device with at least one of the categories. For example a user endpoint device may be associated with a category established for user endpoint devices manufactured by the same manufacturer.

In optional step 213, the processor establishes at least one user group. In one embodiment, a user group is established for a set of user endpoint devices that are associated with a category and are on the same network element. The processor proceeds to step 225.

In optional step 215, the processor monitors for a query for trouble isolation. For example, the processor of an application server may receive a query for trouble isolation from a customer care system, e.g., customer care system 107. The processor then proceeds to step 217.

In optional step 217, the processor determines whether the query for trouble isolation is received. When a query for trouble isolation is received, the method proceeds to step 219. Otherwise, the processor returns to step 215.

In optional step 219, the processor processes the query to identify at least one user group with which the user endpoint device is associated. For example, the user endpoint devices may be associated with a user group that is established for the user endpoint devices using the same operating system and the like.

In optional step 221, for each user group with which the user endpoint device is associated, the processor collects data associated with one or more abnormal cause codes of the user group. For example, the processor may collect data from maintenance systems. The processor then proceeds to step 235.

In step 225, the processor monitors sessions, for a user group, for detecting one or more abnormal cause codes of the user group. For example, the monitoring is intended to detect when there is an abnormal cause code that is associated with the user group, e.g., an abnormal cause code for indicating a timing out of a session request and the like.

In step 227, the processor determines whether an abnormal cause code of the user group is detected. When an abnormal cause code of the user group is detected, the processor proceeds to step 230. Otherwise, the processor returns to step 225.

In optional step 230, the processor updates data associated with the abnormal cause code of the user group. For example, a number of counts of the detected abnormal cause code of the user group may be incremented. The processor proceeds to step 235.

In step 235, the processor determines, for the user group, whether a deviation is determined for at least one abnormal cause code of the user group. For example, the deviation may be determined from a baseline that is established for the abnormal cause code of the user group. When the deviation is determined for the abnormal cause code of the user group, the processor proceeds to step 240. Otherwise, the processor proceeds to step 215 and/or step 225.

In step 240, the processor performs trouble isolation for separating troubles by a root cause. For example, the trouble isolation may be for determining whether the root cause is an issue associated with a communication network operated by a network service provider, or an issue associated with user endpoint devices of the user group.

In step 245, the processor determines whether the root cause is an issue associated with a communications network operated by a network service provider. When the root cause is an issue associated with the communications network, the processor proceeds to step 250. Otherwise, the processor proceeds to step 255.

In step 250, the processor generates a ticket for indicating that the root cause is an issue associated with a communications network operated by a network service provider. For example, the root cause may be an issue associated with a base station, with base stations in the same submarket, and so on. Then, the processor proceeds to step 260.

In step 255, the processor generates a ticket for indicating that the root cause is an issue associated with the user endpoint devices of the user group. For example, the issue may be related to a release of an operating system deployed in user endpoint devices and the like. Then, the processor proceeds to step 260.

In optional step 260, the processor provides a notice to a customer care system. In one example, the notice comprises a list of user endpoint devices and/or services that are affected by the root cause. In another example, the notice comprises a list of user endpoint devices that are potential sources of the root cause. The processor then proceeds either to step 215, 225 or to step 299 to end the method.

In another embodiment, the customer care system 107 itself is used for implementing the present method for providing trouble isolation. The customer care system 107 is for receiving a report of a performance problem, for determining whether the report is for a known performance problem, for addressing the performance problem in accordance with a notice that was previously received when the report is for the known performance problem, for sending a query for trouble isolation to an application server when the report is not for a known performance problem, for determining whether a response is received, and for addressing the performance problem in accordance with the response when the response to the query is received. For example, when the customer care system receives a report for a new performance problem, the customer care system may invoke the above method 200 by sending a query for trouble isolation to be performed by an application server, e.g., an AS 104. Upon receiving a response to the query, the customer care system may address the performance problem in accordance with the response.

Figure 3:
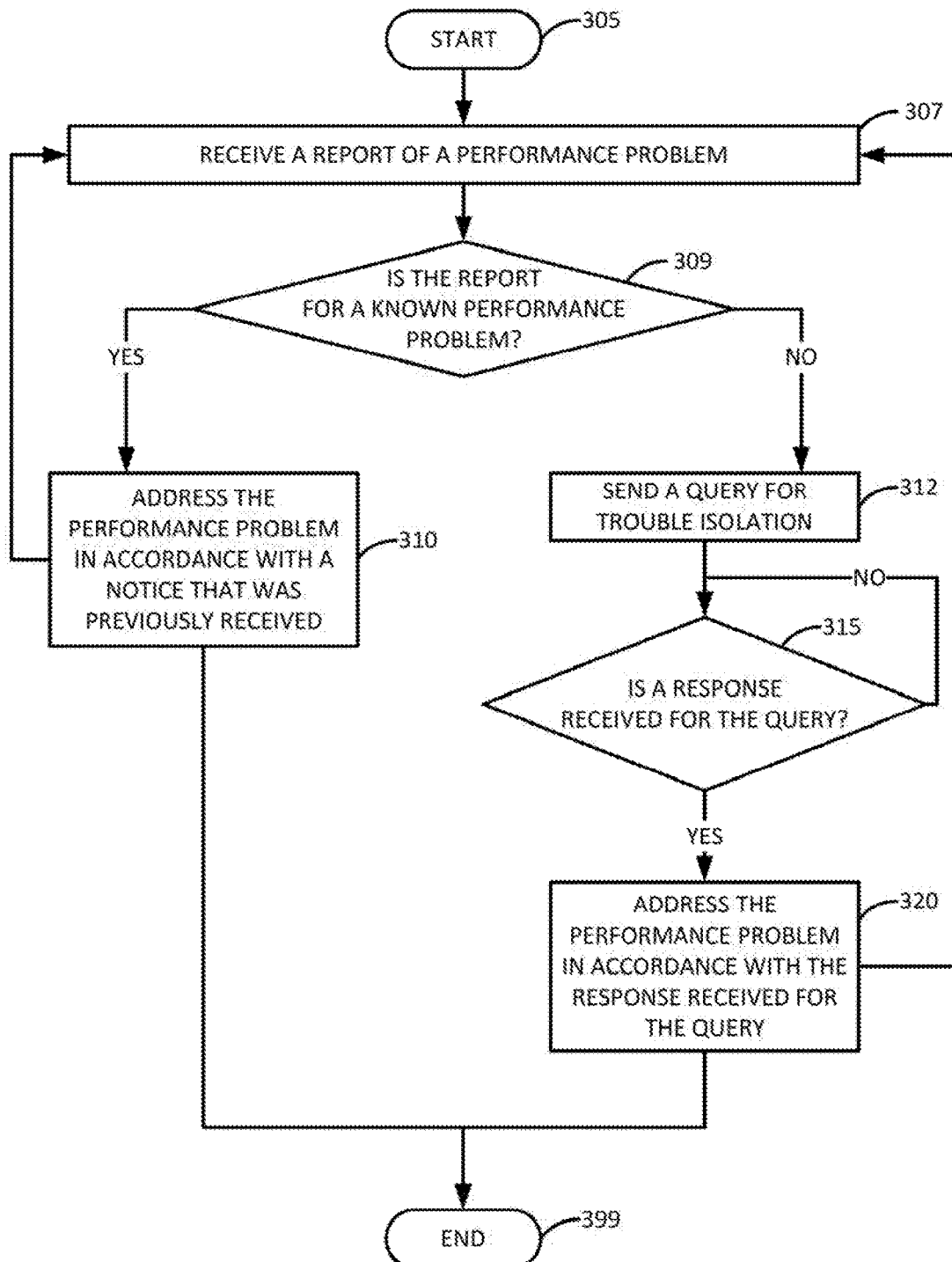
FIG. 3 illustrates a flowchart of an example method for providing trouble isolation by a customer care system.

FIG. 3 illustrates a flowchart of an example method 300 for providing trouble isolation by a customer care system in accordance with the present disclosure. In one embodiment, the method 300 may be implemented in a customer care system 107, or the processor 402 as described in FIG. 4. The method 300 starts in step 305 and proceeds to step 307.

In step 307, the processor receives a report of a performance problem. For example, the customer care system receives the report from a customer. In step 309, the processor determines whether the report is for a known performance problem. In one example, the report may be for a performance problem for which the customer care system has already received a notice from a server, e.g., the AS 104. When the report is for a known performance problem, the processor proceeds to step 310. Otherwise, the processor proceeds to step 312.

In step 310, the processor addresses the performance problem in accordance with a notice that was previously received as discussed above. The method then proceeds to step 307 or to step 399 to end the process. In step 312, the processor sends a query for trouble isolation. For example, the query may be sent to AS 104. In step 315, the processor determines whether a response is received. For example, a response to the query may be received from AS 104. The processor continues its monitoring function until the response is received. When a response is received, the processor proceeds to step 320. In step 320, the processor addresses the performance problem in accordance with the response as discussed above. The method then proceeds either to step 307 or to step 399 to end the process.

In addition, although not specifically specified, one or more steps, functions or operations of method 200 or method 300 may include a storing, displaying and/or outputting step as required for a particular application. In other words, any data, records, fields, and/or intermediate results discussed in the method can be stored, displayed and/or outputted either on the device executing the method or to another device, as required for a particular application.

Furthermore, steps, blocks, functions or operations in FIG. 2 or FIG. 3 that recite a determining operation or involve a decision do not necessarily require that both branches of the determining operation be practiced. In other words, one of the branches of the determining operation can be deemed as an optional step. Moreover, steps, blocks, functions or operations of the above described method 200 or method 300 can be combined, separated, and/or performed in a different order from that described above, without departing from the example embodiments of the present disclosure.

As such, the present disclosure provides at least one advancement in the technical field of trouble isolation. For instance, in one example, the present disclosure provides a dedicated trouble isolation server and a communication network that is able to analyze data collected for sessions to determine whether a deviation for an abnormal cause code of a user group is due to an issue associated with the communications network or the user endpoint devices being used to access services from the communications network. A ticket may then be generated for the issue in accordance with the trouble isolation, i.e., the ticket may be to address an issue associated with the communications network or the user endpoint devices of the user group.

FIG. 4 depicts a high-level block diagram of a computer suitable for use in performing the functions described herein. As depicted in FIG. 4, the system 400 comprises one or more hardware processor elements 402 (e.g., a central processing unit (CPU), a microprocessor, or a multi-core processor), a memory 404, e.g., random access memory (RAM) and/or read only memory (ROM), a module 405 for providing trouble isolation, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method 200 or method 300 as discussed above is implemented in a distributed or parallel manner for a particular illustrative example, i.e., the steps of the above method 200 or method 300, or each of the entire method 200 or method 300 is implemented across multiple or parallel computers, then the computer of this figure is intended to represent each of those multiple computers.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computer or any other hardware equivalents, e.g., computer readable instructions pertaining to the method(s) discussed above can be used to configure a hardware processor to perform the steps, functions and/or operations of the above disclosed method.

In one embodiment, instructions and data for the present module or process 405 for providing trouble isolation (e.g., a software program comprising computer-executable instructions) can be loaded into memory 404 and executed by hardware processor element 402 to implement the steps, functions or operations as discussed above in connection with the illustrative method 200 or 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for providing trouble isolation (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A method comprising:
   monitoring a plurality of sessions for a user group of user endpoint devices, via a processor of an application server of a communications network operated by a network service provider, for detecting an abnormal cause code associated with the user group, wherein the user group is established for the user endpoint devices that are associated with a first category;
   aggregating, via the processor, the abnormal cause code over a plurality of user groups comprising the user group and other user groups having user endpoint devices that are associated with a plurality of different categories including the first category, wherein the plurality of different categories comprises a plurality of different operating systems, wherein the aggregating of the abnormal cause code over the plurality of user groups is performed in accordance with at least one criterion, the at least one criterion comprising a browser software used by the user endpoint devices of the plurality of user groups;
   determining, via the processor, a root cause for the abnormal cause code when a deviation is determined to have occurred for the abnormal cause code in connection with the plurality of user groups, wherein the deviation is determined from a baseline comprising a number of occurrences of the abnormal cause code aggregated over the plurality of user groups within a time period, wherein the root cause identifies either an issue associated with the communications network or an issue associated with the user endpoint devices of the plurality of user groups; and
   generating, via the processor, a ticket indicating the root cause.

2. The method of claim 1, wherein the first category is established based on a predetermined granularity level.

3. The method of claim 2, wherein the predetermined granularity level is for establishing the first category based on at least one of: a type of the user endpoint devices of the user group, a manufacturer of the user endpoint devices of the user group, an operating system used by the user endpoint devices of the user group, a version of the operating system used by the user endpoint devices of the user group, or a software application installed in the user endpoint devices of the user group.

4. The method of claim 1, further comprising:
   updating, via the processor, data associated with the abnormal cause code when the abnormal cause code is detected.

5. The method of claim 1, wherein the abnormal cause code comprises a session initiation protocol error code for the plurality of sessions that is monitored.

6. The method of claim 1, wherein the baseline is established for the abnormal cause code using a prediction model.

7. The method of claim 1, wherein the baseline is established for the abnormal cause code in accordance with a performance criterion.

8. The method of claim 1, further comprising:
   providing, via the processor, a notice to a customer care system, wherein the notice comprises at least one of: a list of the user endpoint devices of the plurality of user groups that is affected by the root cause, a service that is affected by the root cause, or a list of the user endpoint devices of the plurality of user groups that could be potential sources of the root cause.

9. The method of claim 8, wherein the customer care system sends a notification to a user endpoint device that subscribes to the service that is affected by the root cause.

10. The method of claim 8, wherein the customer care system notifies a user endpoint device on the list of the user endpoint devices that could be potential sources of the root cause that the user endpoint device is a potential source of the root cause.

11. The method of claim 1, wherein when the root cause is identified as being the issue associated with the user endpoint devices of the plurality of user groups, the determining further comprises determining whether the root cause is associated with at least one of: a type of the user endpoint devices of the plurality of user groups, an operating system used by the user endpoint devices of the plurality of user groups, a version of the operating system used by the user endpoint devices of the plurality of user groups, a model of the user endpoint devices of the plurality of user groups, a configuration of the user endpoint devices of the plurality of user groups, a software application that is installed on the user endpoint devices of the plurality of user groups, or a configuration of the software application that is installed on the user endpoint devices of the plurality of user groups.

12. The method of claim 1, further comprising:
aggregating, via the processor, the abnormal cause code with other abnormal cause codes.

13. The method of claim 1, wherein the at least one criterion further comprises at least one of: a manufacturer of hardware network elements associated with the plurality of user groups, a type of the user endpoint devices of the plurality of user groups, a manufacturer of the user endpoint devices of the plurality of user groups, or a version of an operating system used by the user endpoint devices of the plurality of user groups.

14. The method of claim 1, further comprising:
receiving, via the processor, a query for trouble isolation from a user endpoint device;
processing, via the processor, the query to identify at least one user group with which the user endpoint device is associated; and
for each user group with which the user endpoint device is associated, collecting, via the processor, data associated with at least one abnormal cause code of each user group.

15. A non-transitory computer-readable storage device storing a plurality of instructions which, when executed by a processor of an application server of a communications network operated by a network service provider, cause the processor to perform operations, the operations comprising:
monitoring a plurality of sessions for a user group of user endpoint devices for detecting an abnormal cause code associated with the user group, wherein the user group is established for the user endpoint devices that are associated with a first category;
aggregating the abnormal cause code over a plurality of user groups comprising the user group and other user groups having user endpoint devices that are associated with a plurality of different categories including the first category, wherein the plurality of different categories comprises a plurality of different operating systems, wherein the aggregating of the abnormal cause code over the plurality of user groups is performed in accordance with at least one criterion, the at least one criterion comprising a browser software used by the user endpoint devices of the plurality of user groups;
determining a root cause for the abnormal cause code when a deviation is determined to have occurred for the abnormal cause code in connection with the plurality of user groups, wherein the deviation is determined from a baseline comprising a number of occurrences of the abnormal cause code aggregated over the plurality of user groups within a time period, wherein the root cause identifies either an issue associated with the communications network or an issue associated with the user endpoint devices of the plurality of user groups; and
generating a ticket indicating the root cause.

16. An apparatus comprising:
a processor of an application server of a communications network operated by a network service provider; and
a non-transitory computer-readable storage device storing a plurality of instructions which, when executed by the processor, cause the processor to perform operations, the operations comprising:
monitoring a plurality of sessions for a user group of user endpoint devices for detecting an abnormal cause code associated with the user group, wherein the user group is established for the user endpoint devices that are associated with a first category;
aggregating the abnormal cause code over a plurality of user groups comprising the user group and other user groups having user endpoint devices that are associated with a plurality of different categories including the first category, wherein the plurality of different categories comprises a plurality of different operating systems, wherein the aggregating of the abnormal cause code over the plurality of user groups is performed in accordance with at least one criterion, the at least one criterion comprising a browser software used by the user endpoint devices of the plurality of user groups;
determining a root cause for the abnormal cause code when a deviation is determined to have occurred for the abnormal cause code in connection with the plurality of user groups, wherein the deviation is determined from a baseline comprising a number of occurrences of the abnormal cause code aggregated over the plurality of user groups within a time period, wherein the root cause identifies either an issue associated with the communications network or an issue associated with the user endpoint devices of the plurality of user groups; and
generating a ticket indicating the root cause.

17. The apparatus of claim 16, wherein the first category is established based on a predetermined granularity level.

18. The apparatus of claim 17, wherein the predetermined granularity level is for establishing the first category based on at least one of: a type of the user endpoint devices of the user group, a manufacturer of the user endpoint devices of the user group, an operating system used by the user endpoint devices of the user group, a version of the operating system used by the user endpoint devices of the user group, or a software application installed in the user endpoint devices of the user group.

19. The apparatus of claim 16, wherein the operations further comprise:
updating data associated with the abnormal cause code when the abnormal cause code is detected.

20. The apparatus of claim 16, wherein the abnormal cause code comprises a session initiation protocol error code for the plurality of sessions that is monitored.

* * * * *